(12) United States Patent
Jones et al.

(10) Patent No.: US 8,043,457 B2
(45) Date of Patent: Oct. 25, 2011

(54) FIBRE PLACEMENT TOOL

(75) Inventors: Chistopher David Jones, Bristol (GB);
Simon John Astwood, Bristol (GB);
Steven Matthew Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 382 days.

(21) Appl. No.: 12/120,760

(22) Filed: May 15, 2008

(65) Prior Publication Data
US 2008/0302486 A1  Dec. 11, 2008

(30) Foreign Application Priority Data
Jun. 6, 2007  (GB) .................................. 0710832.7

(51) Int. Cl.
*B65H 81/00*   (2006.01)
(52) U.S. Cl. ........ 156/173; 156/175; 156/184; 156/425; 264/313
(58) Field of Classification Search .................. 156/155, 156/171–175, 184–195, 425–432; 264/313
See application file for complete search history.

(56) References Cited

U.S. PATENT DOCUMENTS

| | | | | |
|---|---|---|---|---|
| 3,607,504 A | * | 9/1971 | Howard | 156/155 |
| 3,795,559 A | * | 3/1974 | Horn et al. | 156/152 |
| 4,462,787 A | | 7/1984 | Bogardus, Jr. et al. | |
| 4,525,228 A | * | 6/1985 | Bowen | 156/155 |
| 4,681,724 A | * | 7/1987 | Faiz et al. | 264/257 |
| 5,022,845 A | * | 6/1991 | Charlson et al. | 425/403 |
| 5,624,618 A | * | 4/1997 | Forman et al. | 264/103 |
| 5,725,709 A | * | 3/1998 | Jensen | 156/169 |
| 2003/0230330 A1 | * | 12/2003 | Gridley | 135/88.09 |
| 2007/0125032 A1 | | 6/2007 | Guerrero et al. | |

FOREIGN PATENT DOCUMENTS

| | | |
|---|---|---|
| EP | 0394934 A1 | 10/1990 |
| EP | 0911143 A1 | 4/1999 |
| GB | 1409736 | 10/1975 |
| JP | 07080948 A | 3/1995 |

OTHER PUBLICATIONS

British Search Report for GB 0710832.7 dated Oct. 8, 2007.

* cited by examiner

*Primary Examiner* — Jeff Aftergut
(74) *Attorney, Agent, or Firm* — Lowe, Hauptman, Ham & Berner, LLP

(57) ABSTRACT

A fiber placement tool comprising a plurality of tool segments, each tool segment having a outer surface defining a predetermined profile, each tool segment being removably mounted on at least one elongate shaft.

16 Claims, 2 Drawing Sheets

FIBRE PLACEMENT TOOL

RELATED APPLICATIONS

The present application is based on, and claims priority from, British Application Number 0710832.7, filed Jun. 6, 2007, the disclosure of which is hereby incorporated by reference herein in its entirety.

BACKGROUND TO THE INVENTION

Fibre placement is a method of manufacturing components from composite fibres, such as carbon composite fibre, that involves repeatedly laying down lengths of the composite fibre onto the outer surface of a tool, referred to herein as a placement tool. The outer surface of the placement tool defines the shape and configuration of at least one surface of the component to be formed. The remaining shape and configuration of the composite fibre component is dictated by the subsequent placement of further layers of composite fibre. Common uses of the fibre placement manufacturing method is in the production of composite fibre components within the aerospace industry. For example, this technique is used in the production of long, thin sections of composite fibre such as leading edge spars for helicopter rotor blades or propeller blades. Equally, this technique is also used in the manufacturer of fuselage sections for commercial passenger aircraft.

During this manufacturing process, the fibre placement tools are mounted within a fibre placement machine that as well as being arranged to lay down repeated strips of composite fibre, is also arranged to rotate and otherwise move the fibre placement tool to allow the fibres to be laid down in the desired precise geometry. The current practice for relatively long and thin components, such as rotor blade spars, is to form the fibre placement tool from one or more commonly used engineering metals. The mass of these metallic placement tools can make them difficult to control when being rotated by the fibre placement machine, thus limiting both the length and total mass of the composite fibre component being produced. The existing metallic placement tools can also deflect under the pressure of the fibre placement head of the placement machine and also the rotational forces generated, due to their relative lack of stiffness, thus resulting in the programming of the fibre placement machine having to take this deflection into consideration for the manufacture of the component within the specified dimensions and tolerances. The relative lack of stiffness of the current metallic placement tools also limits the length of single component that can be manufactured using the placement tools, which is an increasing disadvantage as the range and size and composite fibres increases in modern aircraft.

Additionally, the existing metallic placement tools tend to be manufactured as one piece tools. This means that should the design of the corresponding component be changed, for example during the overall design and development phase of the associated structure, a completely new placement tool is required. Similarly, in the event of the placement tool being damaged, which can happen from time to time during the fibre placement process, the entire placement tool must generally be replaced.

It is therefore an object of embodiments of the present invention to provide a fibre placement tool that allows a greater degree of flexibility in the manufacturer of composite fibre components than provided by the existing metallic placement tools.

SUMMARY OF THE INVENTION

According to a first aspect of the present invention there is provided a fibre placement tool comprising a plurality of tool segments, each tool segment having an outer surface defining a predetermined profile, each tool segment being removably mounted on at least one elongate shaft.

Preferably each tool segment includes at least one through hole formed therein, the through hole extending through the tool segment along a longitudinal axis thereof and having a cross-section corresponding to the cross-section of at least one of the elongate shaft.

Additionally or alternatively, the fibre placement tool may comprise a plurality of elongate shafts.

The cross-section of at least one of the elongate shafts may be non-circular.

Preferably, the fibre placement tool includes means for securing the tool segments on each elongate shaft.

Preferably, each tool segment may comprises high density foam. Additionally, each tool segment may include at least one reinforcing rib. Additionally or alternatively, each tool segment may comprise an outer layer of composite fibre.

BRIEF DESCRIPTION OF THE DRAWINGS

Embodiments of the present invention will now be described, by way of illustrative and non-limiting example only, with reference to the accompanying figures, of which.

DESCRIPTION OF EMBODIMENTS OF THE INVENTION

Figure 1:
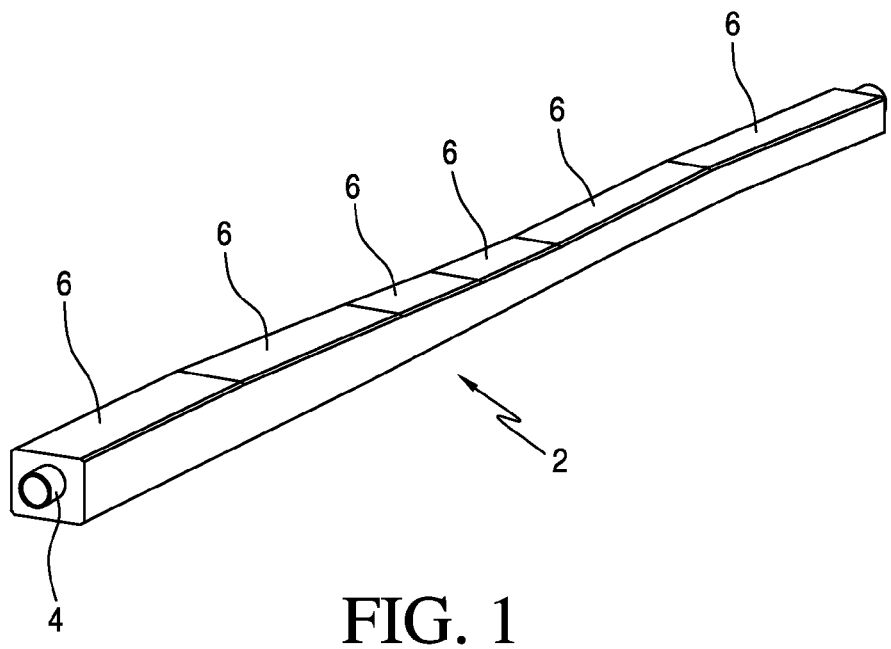
FIG. 1 shows a fibre placement tool according to an embodiment of the present invention.

An embodiment of the present invention is shown in FIG. 1. In the particular embodiment shown, the placement tool 2 comprises an elongate shaft 4. The elongate shaft 4 may be manufactured from hollow steel or other metal, or may comprise a composite fibre shaft. Placed over the elongate shaft 4 are a plurality of tool segments 6. The combined shape and profile of the individual tool segments corresponds to the desired shape and profile of at least a first surface of an elongate component to be manufactured using the placement tool 2. The number of modular tool segments required for a given individual component will depend on the component design, shape and the risk associated with design change during the development phase of the component design. For example, where there is a significant chance that the design of the desired component will change during subsequent development, a greater number of tool segments may be provided, to allow the design changes to be accommodated by replacing one or more of the tool segments.

Figure 2:
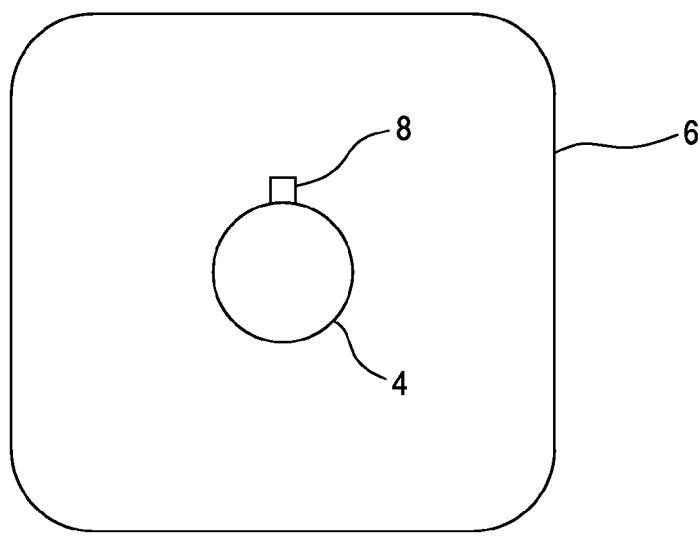
FIG. 2 shows a cross section through a tool segment according of an embodiment of the present invention.

Each tool segment 6 has a through hole formed along a longitudinal axis of the tool segment, the cross-section of the through hole corresponding to that of the elongate shaft 4 such that each tool segment can be threaded onto the elongate shaft 4 to allow the final outer profile of the placement tool to be formed by threading the plurality of tool segments onto the elongate shaft 4. Where a single elongate shaft 4 is used, as illustrated in the embodiment shown in FIG. 1, the individual tool segments may be located with respect to the elongate shaft, and with respect to one another, by way of a keyway. For example, the cross-section of the elongate shaft 4 may be substantially circular with the exception of a raised ridge, or key 8, as illustrated in FIG. 2. The through hole in each tool segment will thus include a correspondingly shaped slot or key way to accommodate the raised ridge on the elongate shaft 4. The raised key thus ensures that all the individual tool segments are correctly aligned with respect to one another on the elongate shaft 4 and also prevents the unwanted rotation of the individual tool segments with respect to the elongate shaft. In alternative embodiments the cross-section of the elongate shaft 4 may be selected so as to automatically restrict how each individual tool segment can be placed on the shaft 4, for example by providing the shaft 4 with an elliptical cross-section thus restricting the number of possible orientations of the tool segment with respect to the shaft 2 to and also preventing unwanted relative rotation of the tool segments with respect to the shaft.

Figure 3:
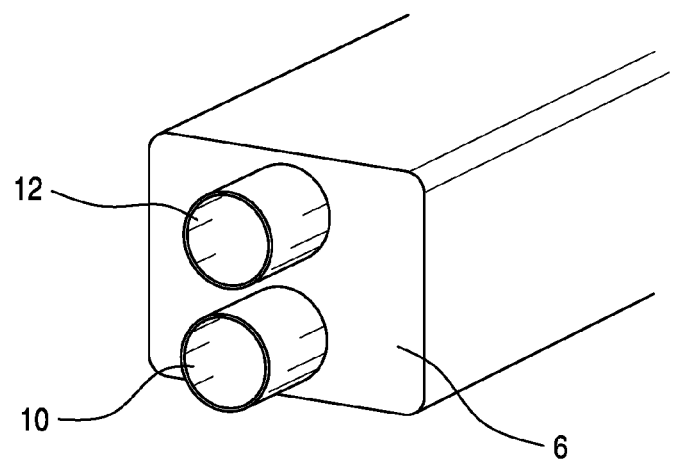
FIG. 3 shows an enlarged view of one end of a further fibre placement tool according to another embodiment of the present invention.

In alternative embodiments a plurality of elongate shafts 4 may be provided, as illustrated in FIG. 3. In the embodiment shown in FIG. 3, which only shows the end section of corresponding placement tool, the placement tool comprises two separate elongate shafts 10, 12. This also achieves the desired effect of restricting the relative placement of the tool segments on the shafts and prevents the relative rotation of the tool segments with respect to the shafts. The number and size of shafts contributes to the stiffness of the tool. By optimising the cross sectional areas of each shaft or shafts it is possible to reduce the deflection of the final tool.

The individual tool segments are held on the corresponding elongate shafts by any suitable means, such as a circlip at each end of the placement tool or individual circlips at either end of the individual tool segments. Other provisions can be made for restraining the tool segments on the shaft or shafts which will be readily appreciated by those skilled in the art, such as for example the use of one or more locating pins past through and secured to the shafts or the provision of a threaded section at one or both ends of each shaft and a correspondingly threaded locknut.

Figure 4:
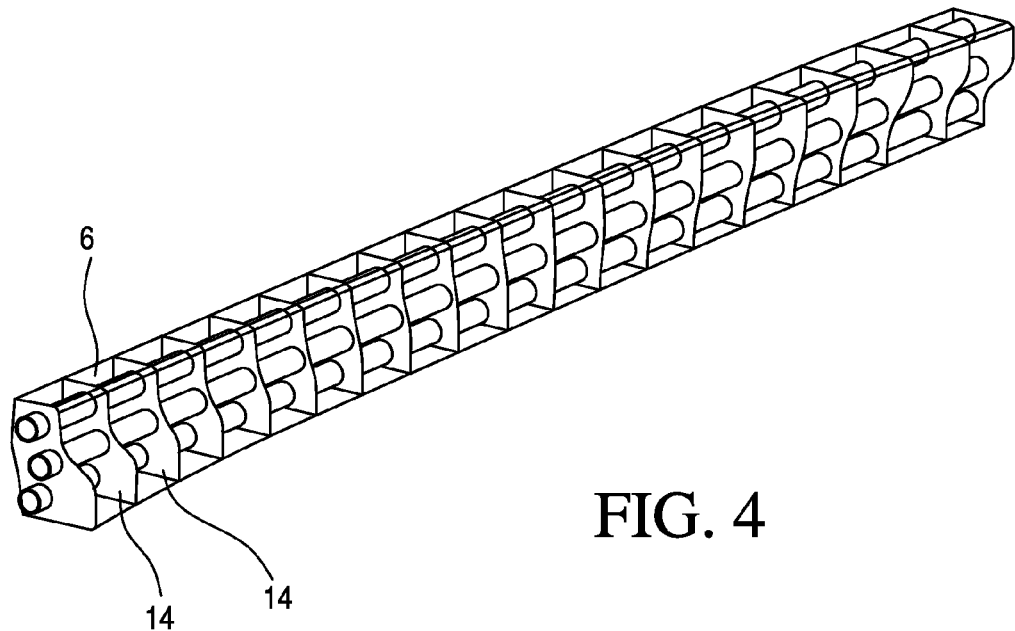
FIG. 4 shows a fibre placement tool according to a further embodiment of the present invention.

Each individual tool segment 6 is preferably manufactured by machining a high density foam block into the desired shape and configuration, but at a nominal thickness below the required final thickness of the tool segment. Pre-impregnated composite plies are then wrapped around the foam block to give the desired resultant surface and dimensions of the tool segment, and thus the manufactured component to be formed on the fibre placement tool. However, in alternative embodiments material other than high density foam may be used, the only requirement being that the material is able to maintain its shape during use. For example, a light weight metal or metal alloy may be used that could be overlaid with the composite plies or may be used as it's surface is produced. In further embodiments, individual reinforcing ribs manufactured from a suitable lightweight metal or other material and having a cross-section corresponding to that of the foam blocks may be bonded to either end of the blocks prior to the composite fibre being wrapped around the foam block and the ribs. This is illustrated in FIG. 4, where it can be seen that each tool segment 6 includes a reinforcing rib 14 at either end of the foam block. A certain amount of cross sectional stiffening is provided from the composite fibres wrapped over the end faces of the foam blocks (even where no additional reinforcing ribs are used) and, therefore, the carbon fibre end faces may be considered ribs. However, the addition of separate reinforcing ribs bonded at either end of the foam block may be used to further enhance the stiffness of the resultant structure.

Also illustrated in FIG. 4 is a further alternative arrangement of the elongate shafts, with three circular shafts being used and being configured such that the individual tool segments can be placed over the three shafts in only a single configuration.

The use of high-density foam wrapped with composite fibres, in conjunction with an optimised selection of elongate shaft design and number of shafts, means that the resulting fibre placement tool has a lower mass than a corresponding conventional metallic alternative. This allows, on the one hand, the fibre placement tool to be operated at higher speeds and with greater accuracy than with the conventional metallic placement tools or, on the other hand, allows individual placement tools to be manufactured with increased component thickness, length or combination of the two without corresponding increase in mass. With regards to the latter advantage, the increase in stiffness of the fibre placement tools manufactured according to embodiments of the present invention, in combination with their lower weight, permit tools of greater length to be produced in comparison to existing metallic tools and thus allow longer components to be produced as single pieces. The use of individual modular tool segments allows individual segments to be removed from the shaft or shafts should that segment be damaged in some manner or should be desired to introduce a change to the geometry of the fibre placement tool, for example if the design of the desired resultant component has changed. As a result, the modular tool segments are reusable. With the development of modern aircraft it is highly likely that such local changes in the tool geometry will be required during the initial stages of manufacture.

Although it has been stated that the preferred material of manufacture for the individual tool segments comprises high density foam wrapped with composite fibres, it will be appreciated by those skilled in the art that acceptable performance may still be obtained by using other lightweight materials. Indeed, the advantages provided by the modular arrangement of the individual tool segments may still be achieved using conventional metallic machining techniques, although the advantages gained by decreasing the mass of the fibre placement tool will not be achieved in those particular embodiments.

Further, in some embodiments the arrangement of stiffening ribs extending from a shaft to supporting an outer skin as shown in FIG. 4 may be advantageous over conventional metallic tooling techniques even in applications where a modular tooling arrangement is not required. The stiffening ribs may be shaped to incorporate the cross-sectional profile of the tool and with the outer surface being defined by a skin which adopts the rib profile to provide an outer surface having a predetermined profile. The ribs may be suitably distributed along the shaft and their individual profile varied so as to vary the shape of the tool along its length.

The invention claimed is:

1. A method of manufacturing a fibre placement tool, comprising the steps of:
    providing at least one elongate shaft;
    providing a plurality of reusable tool segments each comprises a high density foam core and an outer layer of composite fibre;
    forming an outer surface defining a predetermined profile on each of said plurality of reusable tool segments;
    forming at least one through hole extending through each of said plurality of reusable tool segments along a longitudinal axis thereof;
    passing said at least one elongate shaft through said at least one through hole; and,
    removing and reusing any one of said plurality of reusable tool segments as needed.

2. The method of claim 1, further comprising the step of forming a cross section of said at least one through hole to correspond to the cross section of the at least one elongate shaft.

3. The method of claim 1, further comprising the step of providing a plurality of elongate shafts.

4. The method of claim 1, further comprising the step of providing a means for securing the plurality of reusable tool segments on said at least one elongate shaft.

5. The method of claim 1, further comprising the step of providing each tool segment with at least one reinforcing rib.

6. The method of claim 1, further comprising the step of providing a longitudinal ridge on an outer surface of said at least one longitudinal shaft.

7. The method of claim 6, further comprising the step of providing a longitudinal slot dimensioned and configured to receive said longitudinal ridge on each of said plurality of reusable tool segments.

8. A fibre placement tool, comprising:
   at least one elongate shaft; and,
   a plurality of reusable tool segments, each of said plurality of reusable tool segments comprises a high density foam core and an outer layer of composite fibre defining a predetermined profile and at least one through hole formed therein extending through each of said plurality of reusable tool segments along a longitudinal axis thereof through which said at least one elongate shaft passes, each of said plurality of reusable tool segments being removably mounted on the at least one elongate shaft.

9. A fibre placement tool according to claim 8, wherein the at least one through hole has a cross section corresponding to the cross section of the at least one elongate shaft.

10. A fibre placement tool according to claim 8, wherein the fibre placement tool comprises a plurality of elongate shafts.

11. A fibre placement tool according to claim 8, wherein the cross section of the at least one of the elongate shaft is non-circular.

12. A fibre placement tool according to claim 8, wherein the fibre placement tool includes means for securing the plurality of reusable tool segments on said at least one elongate shaft.

13. A fibre placement tool according to claim 8, wherein each tool segment includes at least one reinforcing rib.

14. A fibre placement tool according to claim 8, wherein said at least one longitudinal shaft includes a longitudinal ridge on an outer surface thereof.

15. A fibre placement tool according to claim 14, wherein each of said plurality of reusable tool segments includes a longitudinal slot dimensioned and configured to receive said longitudinal ridge therewithin.

16. A fibre placement tool according to claim 12, wherein said means for securing said plurality of reusable tool segments on said at least one elongate shaft is a circlip.

\* \* \* \* \*